US009552633B2

(12) United States Patent
Sahu et al.

(10) Patent No.: US 9,552,633 B2
(45) Date of Patent: Jan. 24, 2017

(54) DEPTH AWARE ENHANCEMENT FOR STEREO VIDEO

(71) Applicant: QUALCOMM Incorporated, San Diego, CA (US)

(72) Inventors: Shilpi Sahu, Bangalore (IN); Mainak Biswas, Bangalore (IN)

(73) Assignee: Qualcomm Incorporated, San Diego, CA (US)

( * ) Notice: Subject to any disclaimer, the term of this patent is extended or adjusted under 35 U.S.C. 154(b) by 438 days.

(21) Appl. No.: 14/201,261

(22) Filed: Mar. 7, 2014

(65) Prior Publication Data
US 2015/0254811 A1  Sep. 10, 2015

(51) Int. Cl.
*G06K 9/00* (2006.01)
*G06T 5/50* (2006.01)
*H04N 13/00* (2006.01)

(52) U.S. Cl.
CPC ............. *G06T 5/50* (2013.01); *H04N 13/0007* (2013.01); *G06T 2207/10012* (2013.01); *G06T 2207/10024* (2013.01); *G06T 2207/10028* (2013.01); *G06T 2207/20012* (2013.01); *G06T 2207/20104* (2013.01); *G06T 2207/20192* (2013.01);
(Continued)

(58) Field of Classification Search
CPC ............ H04N 13/0007; H04N 13/0011; H04N 13/0018; H04N 13/026; G06T 15/205; G06T 2207/10012
See application file for complete search history.

(56) References Cited

U.S. PATENT DOCUMENTS 9,053,575 B2 * 6/2015 Shimoyama .......... G06T 15/205
2010/0164952 A1 * 7/2010 Roderick ............. H04N 13/026
345/419

(Continued)

FOREIGN PATENT DOCUMENTS

EP  1418766 A2  5/2004
EP  2634772 A1  9/2013
EP  2683169 A2  1/2014

OTHER PUBLICATIONS

Kim J., et al., "A High Quality Depth Map Upsampling Method Robust to Misalignment of Depth and Color Boundaries," Journal of Signal Processing Systems, Jun. 2013; 15 pages.

(Continued)

*Primary Examiner* — Gregory M Desire
(74) *Attorney, Agent, or Firm* — Knobbe, Martens, Olson & Bear, LLP

(57) ABSTRACT

Systems, methods, and devices for enhancing an image are described herein. In some aspects, a device comprises a memory unit configured to store a left image and a right image. The left image and right image each depict a same scene from a different viewpoint. The device further comprises a coder configured to retrieve the left image and the right image from the memory unit. The coder is configured to determine a depth map based on a difference in spatial orientation between the left and right image. The device further comprises a processor coupled to the coder. The processor is configured to identify a portion of the left or right image selected by a user. The processor is further configured to determine an enhancement region surrounding the portion selected by the user based on the depth map. The processor is further configured to enhance the enhancement region.

30 Claims, 14 Drawing Sheets

(52) U.S. Cl.
CPC ............... *H04N 2013/0081* (2013.01); *H04N 2013/0088* (2013.01); *H04N 2013/0092* (2013.01)

(56) References Cited

U.S. PATENT DOCUMENTS

| | | | |
|---|---|---|---|
| 2011/0109618 A1 | 5/2011 | Nowak et al. | |
| 2011/0122230 A1* | 5/2011 | Boisson | H04N 13/0022 348/47 |
| 2012/0008852 A1* | 1/2012 | Niu | H04N 13/0011 382/154 |
| 2012/0242790 A1* | 9/2012 | Sandrew | H04N 13/0267 348/43 |
| 2012/0293624 A1* | 11/2012 | Chen | H04N 13/0022 348/46 |
| 2013/0033582 A1 | 2/2013 | Sun et al. | |
| 2013/0033586 A1 | 2/2013 | Hulyalkar | |
| 2014/0104268 A1* | 4/2014 | Lipton | H04N 13/0018 345/419 |
| 2014/0232820 A1* | 8/2014 | Ha | H04N 13/026 348/43 |
| 2014/0333739 A1* | 11/2014 | Yang | H04N 13/0011 348/54 |
| 2015/0254811 A1* | 9/2015 | Sahu | H04N 13/0007 382/154 |

OTHER PUBLICATIONS

Kim J., et al., "Gradient Weighted Joint Bilateral Filtering for Depth Map Upsampling," Proceedings of 3D Systems and Applications, Feb. 2011, 4 pages.

Lee K.R., et al., "Sampling Based Robust Multilateral Filter for Depth Enhancement," Proceedings of 20th European Signal Processing Conference, Bucharest, Romania, Aug. 2012, pp. 1124-1128.

Mei X., et al., "On building an accurate stereo matching system on graphics hardware," IEEE International Conference on Computer Vision Workshops ICCV Workshops, 2011, pp. 467-474.

Wiegand T et al., "Overview of the H.264/AVC Video Coding Standard", IEEE Transactions On Circuits and Systems For Video Technology, IEEE Service Center, Piscataway, NJ, US, vol. 13, No. 7, Jul. 1, 2003 (Jul. 1, 2003), pp. 560-576, XP011221093, ISSN: 1051-8215, DOI: DOI:10.1109/TCSVT.2003.815165.

Hachicha W., et al., "Combining Depth Information and Local Edge Detection for Stereo Image Enhancement," 20th European Signal Processing Conference, EUSIPCO, 2012, Bucharest, Romania, Aug. 27-31, 2012, pp. 250-254.

Li C.T., et al., "A Real-time Image Enhancement System Using Depth from Edge," in International Conference on 3D systems and Applications (3DSA), 2010, 4 pages.

International Search Report and Written Opinion—PCT/US2015/017104—ISA/EPO—May 20, 2015.

\* cited by examiner

DEPTH AWARE ENHANCEMENT FOR STEREO VIDEO

TECHNICAL FIELD

This disclosure is related to the field of depth-based image enhancement. More particularly, this disclosure relates to the enhancement of monocular images using depth computed from stereo images.

BACKGROUND

Visual media, such as images and video, can be captured with a camera or video camera. Often, if the camera or video camera includes sufficient features and includes a proper lens, the captured media reflects the color, contrast, sharpness, and/or the like desired by the end-user. However, full-featured cameras or video cameras and/or powerful lenses can be expensive. Furthermore, full-featured cameras or videos cameras and/or powerful lenses can be bulky and difficult to carry in certain situations.

Today, portable devices, such as cell phones or tablets, include a built-in camera. Because portable devices include a wide array of functions in addition to the ability to capture visual media, many people forgo carrying the bulky, expensive cameras and lenses in favor of the portable devices. However, the cameras built into the portable devices have a restricted number of features. In addition, the built-in cameras generally have basic lenses. Thus, the visual media captured by the built-in cameras are generally of a poorer quality and lack the desired color, contrast, sharpness, and/or the like.

Applications available on the portable device or another device can be used to process and enhance the captured visual media. For example, applications can be used by the end-user to adjust color, enhance contrast, sharpen edges, and/or the like. However, many of the applications can be processor-intensive and/or require additional hardware. This can be especially problematic on portable devices, as the applications can increase battery consumption and/or the size of the device.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved communications between access points and stations in a wireless network.

One aspect of the disclosure provides a method for enhancing an image. The method comprises retrieving a left image and a right image stored in a memory unit. The left image and the right image may each depict a same scene from a different viewpoint. The method further comprises determining a depth map based on a difference in spatial orientation between the left image and the right image. The method further comprises identifying a portion of the left image or the right image selected by a user. The method further comprises determining an enhancement region surrounding the portion selected by the user based on the determined depth map. The method further comprises enhancing the enhancement region.

Another aspect of the disclosure provides an apparatus for enhancing an image. The apparatus comprises means for retrieving a left image and a right image stored in a memory unit. The left image and the right image may each depict a same scene from a different viewpoint. The apparatus further comprises means for determining a depth map based on a difference in spatial orientation between the left image and the right image. The apparatus further comprises means for identifying a portion of the left image or the right image selected by a user. The apparatus further comprises means for determining an enhancement region surrounding the portion selected by the user based on the determined depth map. The apparatus further comprises means for enhancing the enhancement region.

Another aspect of the disclosure provides a non-transitory computer-readable medium comprising code that, when executed, causes an apparatus to retrieve a left image and a right image stored in a memory unit. The left image and the right image may each depict a same scene from a different viewpoint. The medium further comprises code that, when executed, causes an apparatus to determine a depth map based on a difference in spatial orientation between the left image and the right image. The medium further comprises code that, when executed, causes an apparatus to identify a portion of the left image or the right image selected by a user. The medium further comprises code that, when executed, causes an apparatus to determine an enhancement region surrounding the portion selected by the user based on the determined depth map. The medium further comprises code that, when executed, causes an apparatus to enhance the enhancement region.

Another aspect of the disclosure provides a device for enhancing an image. The device comprises a memory unit configured to store a left image and a right image. The left image and the right image may each depict a same scene from a different viewpoint. The device further comprises a coder configured to retrieve the left image and the right image from the memory unit. The coder may be further configured to determine a depth map based on a difference in spatial orientation between the left image and the right image. The device further comprises a processor coupled to the coder. The processor may be configured to identify a portion of the left image or the right image selected by a user. The processor may be further configured to determine an enhancement region surrounding the portion selected by the user based on the determined depth map. The processor may be further configured to enhance the enhancement region.

DETAILED DESCRIPTION

Figure 1:
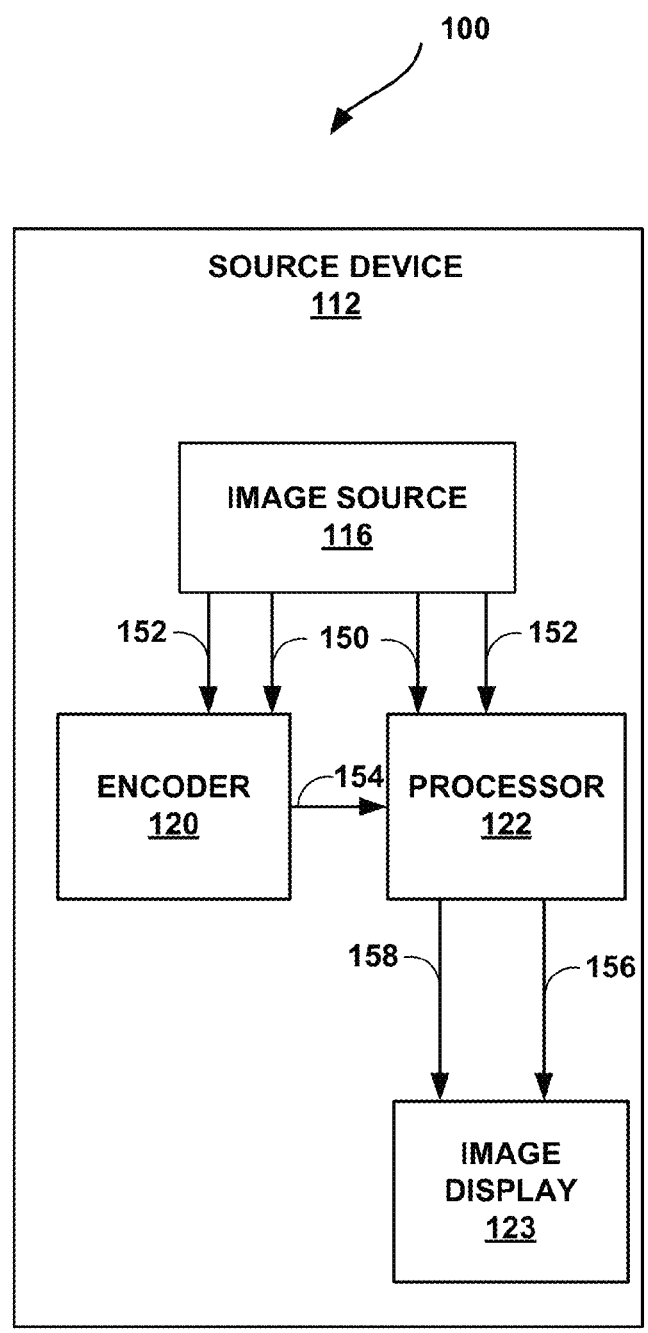
FIG. 1 is a block diagram illustrating an example system in which a source device enhances a stereo image.

As described above, full-featured cameras or video cameras that have powerful lenses and/or other components can be expensive. Applications available on a device, such as a portable device, can be used to process and enhance captured visual media (e.g., images, video, etc.) to mimic the effects produced by the powerful lenses and/or other components. For example, applications can be used by an end-user to adjust color, enhance contrast, sharpen edges, change geometric shapes, and/or the like. However, many of the applications are processor-intensive and/or require additional hardware to implement some or all of the enhancement features. As an example, the process or determining a portion of the media to enhance can be processor-intensive. In addition, special hardware, such as a depth map engine, could be needed to determine the portion of the media to enhance and/or a portion of the media not to enhance. The processor-intensive nature of such applications and/or the necessity to include additional hardware can be especially problematic on portable devices because the applications can increase battery consumption and/or the size of the device.

Accordingly, the systems and methods described herein use the existing hardware on a device to enable applications to perform enhancement features. In addition, the systems and methods described herein allow the device to perform certain operations, such as those operations that are processor-intensive, while the device is idle, being charged, or otherwise in a state in which battery consumption is not an issue. In this way, the systems and methods described herein allow devices to offer various enhancement features while minimizing battery consumption and maintaining or even reducing the size of the device.

While the techniques described herein can be applied to any type and any number of images or sequences of images (e.g., video), the techniques as disclosed herein are described with respect to stereo images and/or stereo video. Stereo images (or a stereo pair of images) generally include a first image and a second image of a common scene. The first and second images may throughout this disclosure also be referred to as left and right images, left and right views, or left (L) and right (R) frames. The first and second images of the stereo pair can be displayed simultaneously or in rapid succession to create a scene with 3D objects. Stereo images or video can be captured using two cameras and are transmitted as a stream of left frames and right frames. Sometimes, although not common, stereo images or video are transmitted as an L frame and are accompanied by a depth map (D) for that frame. However, in other cases as described herein, stereo images or video are transmitted without a depth map for the frames. The depth map, however, can be computed using the L and R frames. Computing the depth map given the two views (L and R) is usually an involved and computationally intensive process. Real-time implementation usually entails a hardware module exclusively for the purpose of computing disparity (e.g., which can be used to determine the depth map). Often, the best disparity calculation algorithms are so complex that they cannot be implemented in real-time or can only be implemented in real-time by devices with significant processing resources. Thus, computing the depth map generally takes extra design and implementation effort if done from scratch. However, as described herein, the existing system can be reused for computing depth, saving on that effort. When the depth map of the video is available, depth aware enhancements can be applied to the stereo image or video.

The term "disparity" as used in this disclosure generally describes the horizontal offset of a pixel in one image relative to a corresponding pixel in the other image (e.g., a difference in spatial orientation between two images). Corresponding pixels, as used in this disclosure, generally refers to pixels (one in a left image and one in a right image) that are associated with the same point in the 3D object when the left image and right image are synthesized to render a 2D or 3D image.

A plurality of disparity values for a stereo pair of images can be stored in a data structure referred to as a disparity map. The disparity map associated with the stereo pair of images represents a two-dimensional (2D) function, d(x, y), that maps pixel coordinates (x, y) in the first image to disparity values (d), such that the value of d at any given (x, y) coordinate in a first image corresponds to the shift in the x-coordinate that needs to be applied to a pixel at coordinate (x, y) in the second image to find the corresponding pixel in the second image. For example, as a specific illustration, a disparity map may store a d value of 6 for a pixel at coordinates (250, 150) in the first image. In this illustration, given the d value of 6, data describing pixel (250, 150), such as chroma and luminance values, in the first image, occurs at pixel (256, 150) in the second image.

The elemental information available in a 2D image is the color value of each pixel. Therefore, one technique for identifying corresponding pixels is to look for the best match of the color value of every pixel in a first image (also called a reference image) among the pixels of a second image (also called a target image), where the target image refers to the companion image in the stereo pair of images. The target image can be one of a left or right image, and the reference image can be the other of the left or right image. As a rectified stereo pair is being considered, the search space in the target image can be limited to the pixels in the same epipolar line as in the reference image. This technique, however, assumes that the color values of the pixels associated with the same point in the object are the same, which is not always a correct assumption. For example, object surfaces generally do not reflect light uniformly in all directions and the two image capture-sensors used to acquire the stereo set may have different colorimetric calibrations. Additionally, the same color value may be found in several pixels along the line, providing several potential matches. Further, a particular pixel or group of pixels might be occluded in the target image, meaning that they are behind an object in the reference image and thus not visible in the 3D image. Thus, disparity values may not be available for pixels in which no corresponding pixel is identified. Interpolation or similar techniques can be used to determine disparity values when such values are otherwise not available.

In an embodiment, a depth map can be formed based on the disparity map. For example, the disparity map can be scaled such that the disparity values range from 0 to a set number (e.g., 255). The scaled disparity map is referred to herein as a depth map. Generally, the scaled values in the depth map correspond with a grayscale (e.g., an 8-bit grayscale if the set number is 255). Thus, as described and illustrated below, the depth map can be graphically represented via a grayscale image.

Most portable devices include an encoder and/or a decoder to transmit data efficiently to other devices. In particular, the encoder and/or the decoder can be used to compress and/or decompress visual media such that the visual media can more quickly be transmitted across a medium. As described herein, an existing encoder and/or decoder can be leveraged to perform additional functions. For example, the encoder and/or decoder can be used to generate in real-time a depth map and determine depth information in an image or sequence of images. Such depth information can be useful in identifying portions of the image that are related (e.g., pixels that, when combined, comprise an object) and portions of the image that are unrelated (e.g., neighboring pixels that are part of different objects). An end-user can the select a portion of the image, and based on the depth information, portions of the image that are related to the selected portion can be enhanced by a processor of the device and/or portions of the image that are unrelated to the selected portion can be degraded by the processor. The systems and methods as disclosed herein are described in greater detail with respect to FIGS. 1-14.

FIG. 1 is a block diagram illustrating an example system in which a source device enhances a stereo image. As illustrated in FIG. 1, system 100 may include a source device 112 with image source 116, encoder 120, processor 122, and image display 123. Source device 112 may comprise a wireless communication device, such as a wireless handset, a so-called cellular or satellite radiotelephone, or any wireless device that can communicate picture and/or video information over a communication channel, in which case the communication channel may comprise a wireless communication channel.

Image source 116 provides a stereo pair of images, including first view 150 and second view 152, to encoder 120 and processor 122. Image source 116 can provide first view 150 and second view 152 to encoder 120 and processor 122 at the same time or at a different time. For example, first view 150 and second view 152 can be provided to encoder 120 immediately after or soon after first view 150 and second view 152 are stored in image source 116. First view 150 and second view 152 can then be provided to processor 122 when an end-user indicates a desire to enhance the first view 150 and/or the second view 152.

Image source 116 may comprise an image sensor array (e.g., a digital still picture camera or digital video camera), a computer-readable storage medium comprising one or more stored images, an interface for receiving digital images from an external source, a processing unit that generates digital images such as by executing a video game or other interactive multimedia source, or other sources of image data. Image source 22 may generally correspond to a source of any one or more of captured, pre-captured, and/or computer-generated images. In some examples, image source 116 may correspond to a camera of a cellular (i.e., mobile) telephone. In general, references to images in this disclosure include both still pictures as well as frames of video data. Thus, aspects of this disclosure may apply both to still digital pictures as well as frames of captured digital video data or computer-generated digital video data.

For example, image source 116 may capture two views of a scene at different perspectives. In various examples, image source 116 may comprise a standard two-dimensional camera, a two camera system that provides a stereoscopic view of a scene, a camera array that captures multiple views of the scene, a camera that captures one view plus depth information, or a first camera on a first device and a second camera on a second device that together provide a stereoscopic view of the scene.

Encoder 120 uses first view 150 and second view 152 to generate a depth map 154. Encoder 120 transfers the depth map 154 to processor 122. Processor 122 uses first view 150, second view 152, and the depth map 154 to generate enhanced first view 156, which is an enhanced version of first view 150, and/or to generate enhanced second view 158, which is an enhanced version of second view 152. Processor 122 transmits enhanced first view 156 and/or enhanced second view 158 to image display 123.

Based on enhanced first view 156 and/or enhanced second view 158, image display 123 can render an enhanced two-dimensional or three-dimensional image. For example, image display 123 can synthesize enhanced first view 156 and enhanced second view 158 to form and display a single two-dimensional image. As another example, image display 123 can simultaneously or alternately display two-dimensional versions of enhanced first view 156 and enhanced second view 158 (e.g., to create a three-dimensional effect). As another example, image display 123 can synthesize enhanced first view 156 and enhanced second view 158 to form and display a single three-dimensional image.

In general, the human vision system (HVS) perceives depth based on an angle of convergence to an object. Objects relatively nearer to the viewer are perceived as closer to the viewer due to the viewer's eyes converging on the object at a greater angle than objects that are relatively further from the viewer. To simulate three dimensions in multimedia such as pictures and video, image display 123 can display two images to a viewer, one image (left and right) for each of the viewer's eyes. Objects that are located at the same spatial location within the image will be generally perceived as being at the same depth as the screen on which the images are being displayed.

To create the illusion of depth, objects may be shown at slightly different positions in each of the images along the horizontal axis. The difference between the locations of the objects in the two images is referred to as disparity. In general, to make an object appear closer to the viewer, relative to the screen, a negative disparity value may be used, whereas to make an object appear further from the user relative to the screen, a positive disparity value may be used. Pixels with positive or negative disparity may, in some examples, be displayed with more or less resolution to increase or decrease sharpness or blurriness to further create the effect of positive or negative depth from a focal point.

Image display 123 may comprise a stereoscopic display or an autostereoscopic display. In general, stereoscopic displays simulate three-dimensions by displaying two images while a viewer wears a head mounted unit, such as goggles or glasses, that direct one image into one eye and a second image into the other eye. In some examples, each image is displayed simultaneously (e.g., with the use of polarized glasses or color-filtering glasses). In some examples, the images are alternated rapidly, and the glasses or goggles rapidly alternate shuttering, in synchronization with the display, to cause the correct image to be shown to only the corresponding eye. Auto-stereoscopic displays do not use glasses but instead may direct the correct images into the viewer's corresponding eyes. For example, auto-stereoscopic displays may be equipped with cameras to determine where a viewer's eyes are located and mechanical and/or electronic means for directing the images to the viewer's eyes.

Figure 2:
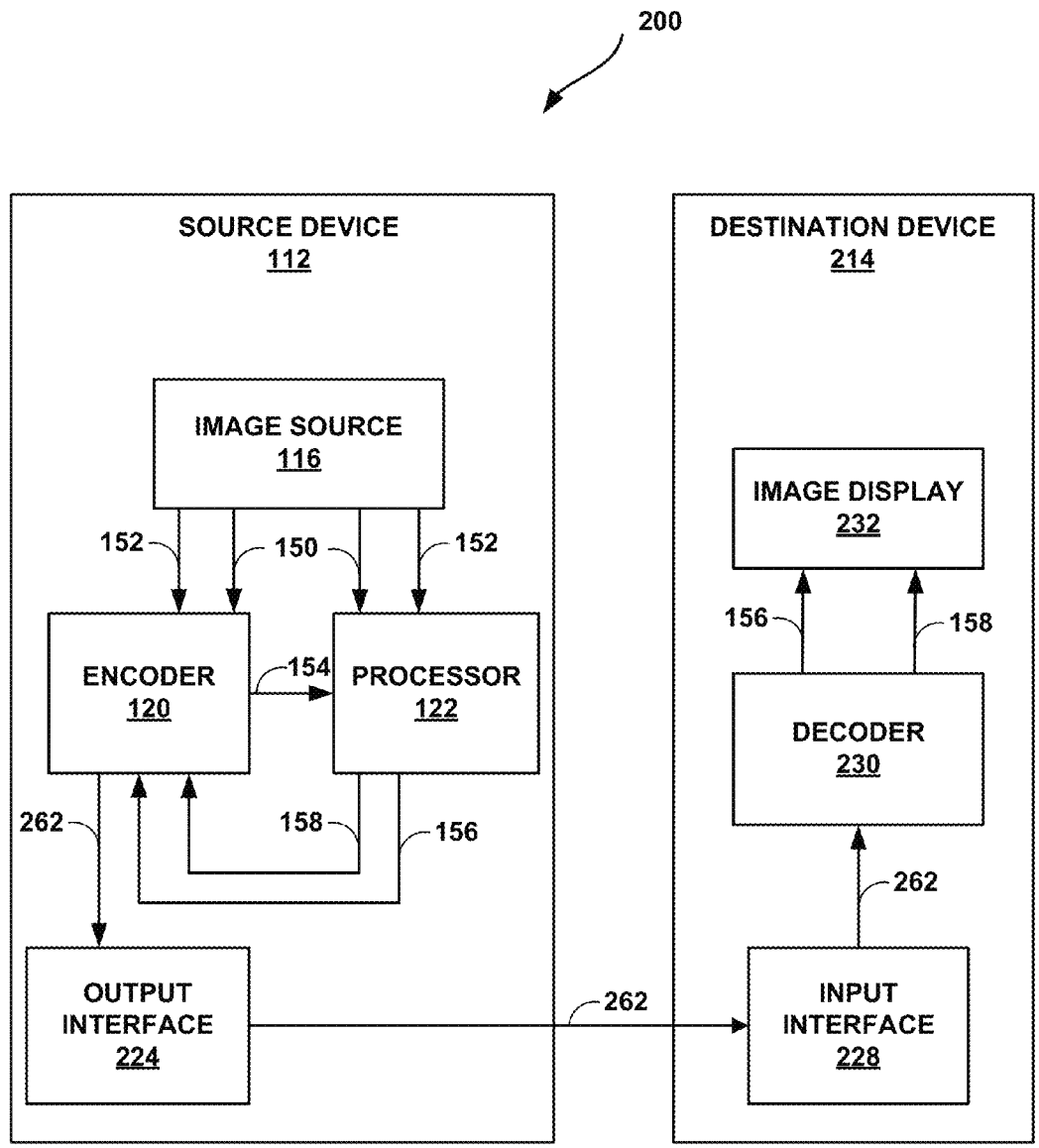
FIG. 2 is a block diagram illustrating an example system in which a source device transmits an enhanced stereo image to a destination device.

FIG. 2 is a block diagram illustrating an example system in which a source device transmits an enhanced stereo image to a destination device. As illustrated in FIG. 2, system 200 may include source device 112 with image source 116, encoder 120, processor 122, an output interface 224, and may further include a destination device 214 with image display 232, decoder 230, and input interface 228. In the example of FIG. 2, destination device 214 receives encoded image data 262 from source device 112. Source device 112 and/or destination device 214 may comprise wireless communication devices, such as wireless handsets, so-called cellular or satellite radiotelephones, or any wireless devices that can communicate picture and/or video information over a communication channel, in which case the communication channel may comprise a wireless communication channel. Destination device 214 may be referred to as a three-dimensional (3D) display device or a 3D rendering device.

As described above with respect to FIG. 1, image source 116 provides a stereo pair of images, including first view 150 and second view 152, to encoder 120 and processor 122. Image source 116 can provide first view 150 and second view 152 to encoder 120 and processor 122 at the same time or at a different time. For example, first view 150 and second view 152 can be provided to encoder 120 immediately after or soon after first view 150 and second view 152 are stored in image source 116. First view 150 and second view 152 can then be provided to processor 122 when an end-user indicates a desire to enhance the first view 150 and/or the second view 152.

Encoder 120 uses first view 150 and second view 152 to generate a depth map 154. Encoder 120 transfers the depth map 154 to processor 122. Processor 122 uses first view 150, second view 152, and the depth map 154 to generate enhanced first view 156, which is an enhanced version of first view 150, and/or to generate enhanced second view 158, which is an enhanced version of second view 152. Processor 122 transmits enhanced first view 156 and/or enhanced second view 158 to encoder 120.

Encoder 120 forms encoded image data 262, which includes encoded image data for enhanced first view 156 and/or for enhanced second view 158. In some examples, encoder 120 may apply various lossless or lossy coding techniques to reduce the number of bits needed to transmit encoded image data 262 from source device 112 to destination device 214. Encoder 120 passes encoded image data 262 to output interface 224.

When enhanced first view 156 and/or enhanced second view 158 is a digital still picture, encoder 120 may be configured to encode the enhanced first view 156 and/or enhanced second view 158 as, for example, a Joint Photographic Experts Group (JPEG) image. When enhanced first view 156 and/or enhanced second view 158 is a frame of video data, encoder 120 may be configured to encode enhanced first view 156 and/or enhanced second view 158 according to a video coding standard such as, for example Motion Picture Experts Group (MPEG), MPEG-2, International Telecommunication Union (ITU) H.261, ISO/IEC MPEG-1 Visual, ITU-T H.262 or ISO/IEC MPEG-2 Visual, ITU H.263, ISO/IEC MPEG-4 Visual and ITU-T H.264 (also known as ISO/IEC MPEG-4 Advanced Video Coding (AVC)), including its SVC and Multiview Video Coding (MVC) extensions, ITU-T H.265, or other video encoding standards. The ITU-T H.264/MPEG-4 (AVC) standard, for example, was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC. A draft of MVC is described in "Advanced video coding for generic audio-visual services," ITU-T Recommendation H.264, March 2010. In addition, High Efficiency Video Coding (HEVC) is currently being developed by the Joint Collaboration Team on Video Coding (JCT-VC) of ITU-T Video Coding Experts Group (VCEG) and ISO/IEC Motion Picture Experts Group (MPEG). A draft of the HEVC standard, referred to as "HEVC Working Draft 7" is in document HCTVC-I1003, Bross et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, $9^{th}$ Meeting: Geneva, Switzerland, Apr. 27, 2012 to May 7, 2012. This document is herein incorporated by reference in its entirety.

In some embodiments, not shown, encoder 120 is configured to encode the depth map 154, which is then transmitted in a bitstream as part of encoded image data 262. This process can produce one depth map for the one captured view or depth maps for several transmitted views. Encoder 120 may receive one or more views and the depth maps, and code them with video coding standards like H.264/AVC, MVC, which can jointly code multiple views, or scalable video coding (SVC), which can jointly code depth and texture.

When enhanced first view 156 and/or enhanced second view 158 corresponds to a frame of video data, encoder 120 may encode enhanced first view 156 and/or enhanced second view 158 in an intra-prediction mode or an inter-prediction mode. As an example, the ITU-T H.264 standard supports intra-prediction in various block sizes, such as 16×16, 8×8, or 4×4 for luma components, and 8×8 for chroma components, as well as inter-prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions (e.g., 16×16 pixels or 16 by 16 pixels). In general, a 16×16 block will have 16 pixels in a vertical direction and 16 pixels in a horizontal direction. Likewise, an N×N block generally has N pixels in a vertical direction and N pixels in a horizontal direction, where N represents a positive integer value that may be greater than 16. The pixels in a block may be arranged in rows and columns. Blocks may also be N×M, where N and M are integers that are not necessarily equal.

Block sizes that are less than 16 by 16 may be referred to as partitions of a 16 by 16 macroblock. Likewise, for an N×N block, block sizes less than N×N may be referred to as partitions of the N×N block. Video blocks may comprise blocks of pixel data in the pixel domain, or blocks of transform coefficients in the transform domain (e.g., following application of a transform such as a discrete cosine transform (DCT), an integer transform, a wavelet transform, or a conceptually similar transform to the residual video block data representing pixel differences between coded video blocks and predictive video blocks). In some cases, a video block may comprise blocks of quantized transform coefficients in the transform domain.

Smaller video blocks can provide better resolution, and may be used for locations of a video frame that include high levels of detail. In general, macroblocks and the various partitions, sometimes referred to as sub-blocks, may be considered to be video blocks. In addition, a slice may be considered to be a plurality of video blocks, such as macroblocks and/or sub-blocks. Each slice may be an independently decodable unit of a video frame. Alternatively, frames themselves may be decodable units, or other portions of a frame may be defined as decodable units. The term "coded unit" or "coding unit" may refer to any independently decodable unit of a video frame such as an entire frame, a slice of a frame, a group of pictures (GOP) also referred to as a sequence or superframe, or another independently decodable unit defined according to applicable coding techniques.

In general, macroblocks and the various sub-blocks or partitions may all be considered to be video blocks. In addition, a slice may be considered to be a series of video blocks, such as macroblocks and/or sub-blocks or partitions. In general a macroblock may refer to a set of chrominance and luminance values that define a 16 by 16 area of pixels. A luminance block may comprise a 16 by 16 set of values, but may be further partitioned into smaller video blocks, such as 8 by 8 blocks, 4 by 4 blocks, 8 by 4 blocks, 4 by 8 blocks or other sizes. Two different chrominance blocks may define color for the macroblock, and may each comprise 8 by 8 sub-sampled blocks of the color values associated with the 16 by 16 area of pixels. Macroblocks may include syntax information to define the coding modes and/or coding techniques applied to the macroblocks. Macroblocks or other video blocks may be grouped into decodable units such as slices, frames or other independent units. Each slice may be an independently decodable unit of a video frame. Alternatively, frames themselves may be decodable units, or other portions of a frame may be defined as decodable units.

Output interface 224 transmits encoded image data 262 to destination device 214. Input interface 228 receives encoded image data 262 from output interface 224. Aspects of this disclosure are not necessarily limited to wireless applications or settings. For example, aspects of this disclosure may be applied to over-the-air television broadcasts, cable television transmissions, satellite television transmissions, Internet video transmissions, encoded digital video that is encoded onto a storage medium, or other scenarios. Accordingly, the communication channel may comprise any combination of wireless or wired media suitable for transmission of encoded video and/or picture data.

Output interface 224 may send a bitstream including encoded image data 262 to input interface 228 of destination device 214. For example, output interface 224 may encapsulate encoded image data 262 in a bitstream using transport level encapsulation techniques (e.g., MPEG-2 Systems techniques). Output interface 224 may comprise, for example, a network interface, a wireless network interface, a radio frequency transmitter, a transmitter/receiver (transceiver), or other transmission unit. In other examples, source device 112 may be configured to store the bitstream including encoded image data 262 to a physical medium such as, for example, an optical storage medium such as a compact disc, a digital video disc, a Blu-Ray disc, flash memory, magnetic media, or other storage media. In such examples, the storage media may be physically transported to the location of destination device 214 and read by an appropriate interface unit for retrieving the data. In some examples, the bitstream including encoded image data 262 may be modulated by a modulator/demodulator (MODEM) before being transmitted by output interface 224.

Although image source 116 may provide multiple views (i.e. enhanced first view 156 and enhanced second view 158), source device 112 may transmit only the enhanced first view 156 or the enhanced second view 158. For example, image source 116 may comprise an eight camera array, intended to produce four pairs of views of a scene to be viewed from different angles. Source device 112 may transmit only one image of each pair to destination device 214. In some embodiments, source device 112 may transmit additional information along with the single image, such as the depth map 154. Thus, rather than transmitting eight views, source device 112 may transmit four views and/or plus depth/disparity information (e.g., depth map 154) for each of the four views in the form of a bitstream including encoded image data 262, in this example. In some examples, processor 122 may receive disparity information for an image (e.g., the depth map 154) from a user or from another external device.

After receiving the bitstream with encoded image data 262 and decapsulating the data, in some examples, input interface 228 may provide encoded image data 262 to decoder 230 (or to a MODEM that demodulates the bitstream, in some examples).

Decoder 230 receives the encoded image data 262 from input interface 228. Decoder 230 decodes the encoded image data 262 to extract enhanced first view 156 and/or enhanced second view 158. Based on the enhanced first view 156 and/or the enhanced second view 158, image display 232, which is the same as or similar to image display 123, can render a two-dimensional or three-dimensional image. Although not shown in FIG. 2, enhanced first view 156 and/or enhanced second view 158 may undergo additional processing at either source device 112 or destination device 214.

Figure 3:
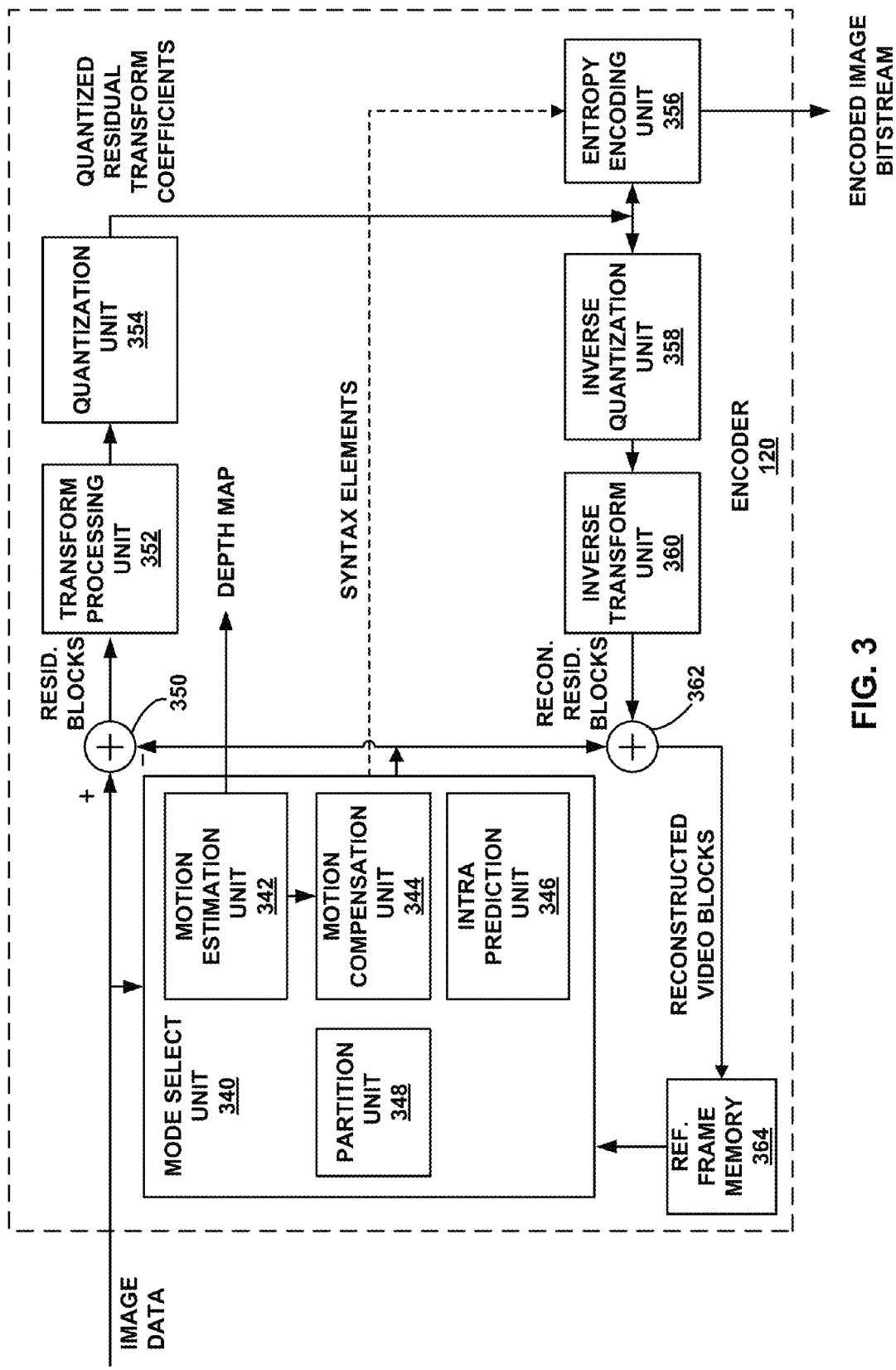
FIG. 3 is a block diagram of an illustrative encoder that may implement techniques of this disclosure.

FIG. 3 is a block diagram illustrating an example of an encoder that may implement techniques in accordance with aspects described in this disclosure. Encoder 120 may be configured to perform any or all of the techniques of this disclosure. For example, mode select unit 340 (e.g., motion estimation unit 342) may be configured to determine a depth map based on a sequence of images (e.g., a left image followed by a right image) received by the encoder 120. However, aspects of this disclosure are not so limited. In some examples, the techniques described in this disclosure may be shared among the various components of encoder 120. In some examples, in addition to or instead of, a processor (not shown) may be configured to perform any or all of the techniques described in this disclosure.

Encoder 120 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes. Encoder 120 may also generate a disparity map and/or a depth map using the inter-coding techniques described herein.

As shown in FIG. 3, encoder 120 receives a current image block within an image or a video frame to be encoded. In the example of FIG. 3, encoder 120 includes mode select unit 340, reference frame memory 364, summer 350, transform processing unit 352, quantization unit 354, and entropy encoding unit 356. Mode select unit 340, in turn, includes motion estimation unit 342, motion compensation unit 344, intra-prediction unit 346, and partition unit 348. For video block reconstruction, encoder 120 also includes inverse quantization unit 358, inverse transform unit 360, and summer 362. A deblocking filter (not shown in FIG. 3) may also be included to filter block boundaries to remove blockiness artifacts from reconstructed video. If desired, the deblocking filter would typically filter the output of summer 362. Additional filters (in loop or post loop) may also be used in addition to the deblocking filter. Such filters are not shown for brevity, but if desired, may filter the output of summer 350 (as an in-loop filter).

During the encoding process, encoder 120 receives an image, a video frame, or slice to be coded. The image, frame, or slice may be divided into multiple blocks. Motion estimation unit 342 and motion compensation unit 344 perform inter-predictive coding of the received block relative to one or more blocks in one or more reference frames to provide temporal prediction. Intra-prediction unit 346 may alternatively perform intra-predictive coding of the received block relative to one or more neighboring blocks in the same frame or slice as the block to be coded to provide spatial prediction. Encoder 120 may perform multiple coding passes (e.g., to select an appropriate coding mode for each block of video data).

Moreover, partition unit 348 may partition blocks of image or video data into sub-blocks, based on an evaluation of previous partitioning schemes in previous coding passes. For example, partition unit 348 may initially partition an image, frame, or slice into largest coding units (LCUs), and partition each of the LCUs into sub-coding units (CUs) based on a rate-distortion analysis (e.g., rate-distortion optimization). Mode select unit 340 (e.g., partition unit 348) may further produce a quadtree data structure indicative of partitioning of an LCU into sub-CUs. Leaf-CUs of the quadtree may include one or more PUs and one or more TUs.

Mode select unit 340 may select one of the coding modes (e.g., intra or inter) based on error results, and provide the resulting intra- or inter-coded block to summer 350 to generate residual block data and to summer 362 to reconstruct the encoded block for use as a reference frame. Mode select unit 340 also provides syntax elements, such as motion vectors, intra-mode indicators, partition information, and other such syntax information, to entropy encoding unit 356.

Motion estimation unit 342 and motion compensation unit 344 can be highly integrated, but are illustrated separately for conceptual purposes. Motion estimation or the prediction of motion information, performed by motion estimation unit 342, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, encoder 120 may calculate values for sub-integer pixel positions of reference pictures stored in reference frame memory 64. For example, encoder 120 may interpolate values of one-quarter pixel positions, one-eighth pixel positions, or other fractional pixel positions of the reference picture. Therefore, motion estimation unit 342 may perform a motion search relative to the full pixel positions and fractional pixel positions and output a motion vector with fractional pixel precision.

Motion estimation unit 342 calculates a motion vector for a PU of a video block in an inter-coded slice by comparing the position of the PU to the position of a predictive block of a reference picture. The reference picture may be selected from a first reference picture list (e.g., List 0), a second reference picture list (e.g., List 1), or a third reference picture list (e.g., List C), each of which identify one or more reference pictures stored in reference frame memory 364. The reference picture may be selected based on the motion information of blocks that spatially and/or temporally neighbor the PU. The selected reference picture may be identified by a reference index. Motion estimation unit 342 sends the calculated motion vector and/or the reference index to entropy encoding unit 356 and/or motion compensation unit 344.

In addition, the motion estimation unit 342 generates a disparity map by comparing two images that are received in sequence (e.g., a left image and a right image) and determining disparity values for each portion (e.g., each pixel, each group of pixels, etc.) in the received images in a manner as described herein. For example, the disparity values can be determined by analyzing the motion between two images. The motion estimation unit 342 can upscale the disparity map to generate a depth map.

Motion compensation, performed by motion compensation unit 344, may involve fetching or generating the predictive block based on the motion vector determined by motion estimation unit 342. Upon receiving the motion vector for the PU of the current video block, motion compensation unit 344 may locate the predictive block to which the motion vector points in one of the reference picture lists. Summer 350 forms a residual video block by subtracting pixel values of the predictive block from the pixel values of the current video block being coded, forming pixel difference values, as discussed below. In some embodiments, motion estimation unit 342 can perform motion estimation relative to luma components, and motion compensation unit 344 can use motion vectors calculated based on the luma components for both chroma components and luma components. Mode select unit 340 may generate syntax elements associated with the video blocks and the video slice for use by decoder 230 in decoding the video blocks of the video slice.

Intra-prediction unit 346 may intra-predict a current block, as an alternative to the inter-prediction performed by motion estimation unit 342 and motion compensation unit 344, in some embodiments. In particular, intra-prediction unit 346 may determine an intra-prediction mode to use to encode a current block. In some examples, intra-prediction unit 346 may encode a current block using various intra-prediction modes (e.g., during separate encoding passes) and intra-prediction unit 346 (or mode select unit 340, in some examples) may select an appropriate intra-prediction mode to use from the tested modes.

For example, intra-prediction unit 346 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 346 may calculate ratios from the distortions and rates for the various encoded blocks to determine which intra-prediction mode exhibits the best rate-distortion value for the block.

After selecting an intra-prediction mode for a block, intra-prediction unit 346 may provide information indicative of the selected intra-prediction mode for the block to entropy encoding unit 356. Entropy encoding unit 356 may encode the information indicating the selected intra-prediction mode. Encoder 120 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

As described above, encoder 120 forms a residual video block by subtracting the prediction data provided by mode select unit 340 from the original video block being coded. Summer 350 represents the component or components that perform this subtraction operation. Transform processing unit 352 applies a transform, such as a DCT or a conceptually similar transform (e.g., wavelet transforms, integer transforms, sub-band transforms, etc.), to the residual block, producing a video block comprising residual transform coefficient values. The transform may convert the residual information from a pixel value domain to a transform domain, such as a frequency domain. Transform processing unit 352 may send the resulting transform coefficients to quantization unit 354. Quantization unit 354 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 356 may perform the scan.

Following quantization, entropy encoding unit 356 entropy codes the quantized transform coefficients. For example, entropy encoding unit 356 may perform CAVLC, CABAC, SBAC, PIPE coding, or another entropy coding technique. In the case of context-based entropy coding, context may be based on neighboring blocks. Following the entropy coding by entropy encoding unit 356, the encoded bitstream may be transmitted to another device (e.g., decoder 230) or archived for later transmission or retrieval.

Inverse quantization unit 358 and inverse transform unit 360 apply inverse quantization and inverse transformation, respectively, to reconstruct the residual block in the pixel domain (e.g., for later use as a reference block). Motion compensation unit 344 may calculate a reference block by adding the residual block to a predictive block of one of the frames stored in reference frame memory 364. Motion compensation unit 344 may also apply one or more interpolation filters to the reconstructed residual block to calculate sub-integer pixel values for use in motion estimation. Summer 362 adds the reconstructed residual block to the motion compensated prediction block produced by motion compensation unit 344 to produce a reconstructed video block for storage in reference frame memory 364. The reconstructed video block may be used by motion estimation unit 342 and motion compensation unit 344 as a reference block to inter-code a block in a subsequent video frame.

Figure 4:
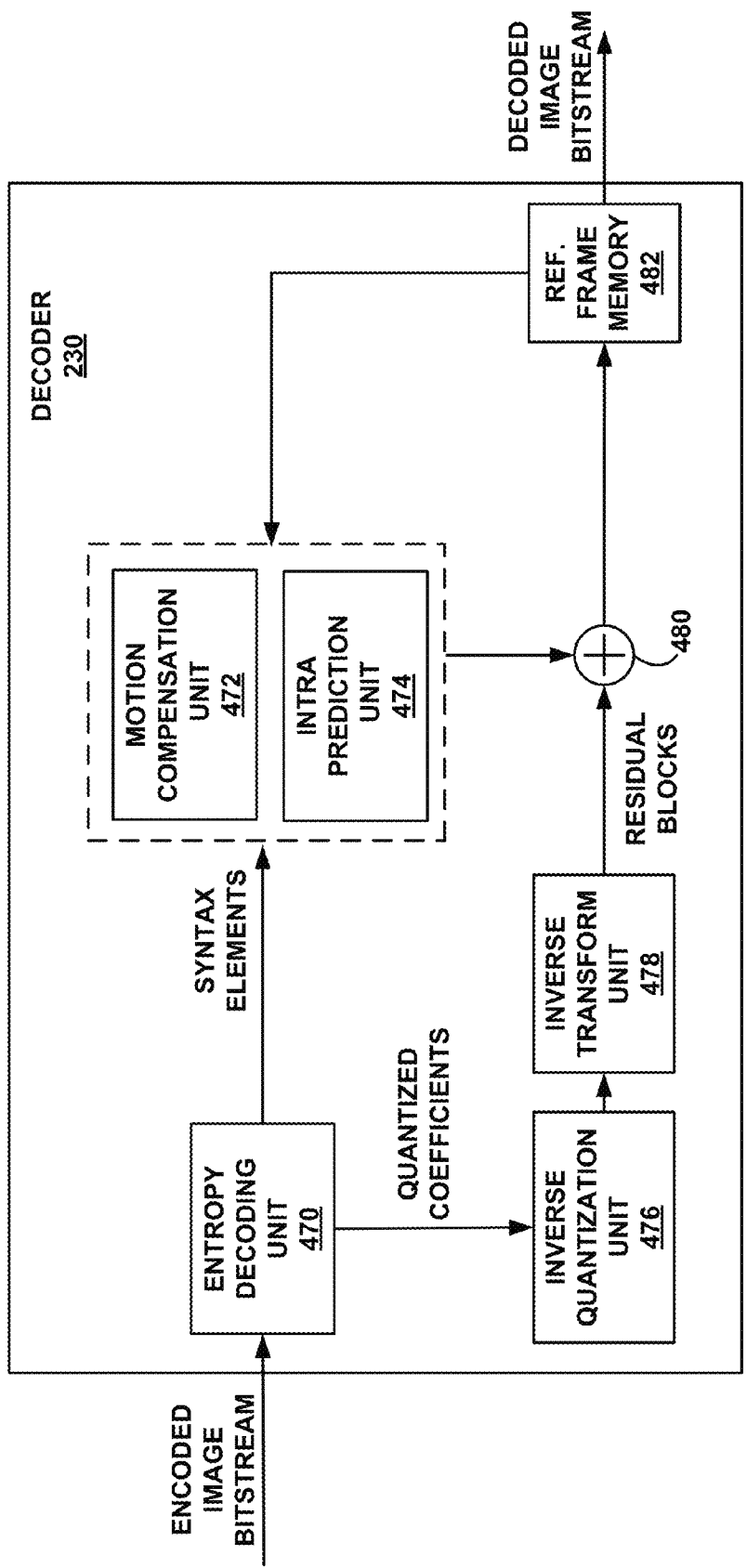
FIG. 4 is a block diagram of an illustrative decoder that may implement techniques of this disclosure.

FIG. 4 is a block diagram illustrating an example of a decoder that may implement techniques in accordance with aspects described in this disclosure. Decoder 230 may be configured to perform any or all of the techniques of this disclosure. For example, the motion compensation unit 472 may be configured to generate a disparity map and/or a depth map. However, aspects of this disclosure are not so limited. In some examples, the techniques described in this disclosure may be shared among the various components of decoder 230. In some examples, in addition to or instead of, a processor (not shown) may be configured to perform any or all of the techniques described in this disclosure.

In the example of FIG. 4, decoder 230 includes an entropy decoding unit 470, motion compensation unit 472, intra prediction unit 474, inverse quantization unit 476, inverse transformation unit 478, reference frame memory 482, and summer 480. Decoder 230 may, in some examples, perform a decoding pass generally reciprocal to the encoding pass described with respect to encoder 120 (FIG. 3). Motion compensation unit 472 may generate prediction data based on motion vectors received from entropy decoding unit 470, while intra-prediction unit 474 may generate prediction data based on intra-prediction mode indicators received from entropy decoding unit 470.

During the decoding process, decoder 230 receives an encoded image bitstream that represents blocks of an encoded image or video slice and associated syntax elements from encoder 120. Entropy decoding unit 470 of decoder 230 entropy decodes the bitstream to generate quantized coefficients, motion vectors or intra-prediction mode indicators, and/or other syntax elements. Entropy decoding unit 470 forwards the motion vectors and other syntax elements to motion compensation unit 472. Decoder 230 may receive the syntax elements at the image, video slice level, and/or the block level.

When the image or video slice is coded as an intra-coded (I) slice, intra prediction unit 474 may generate prediction data for a block of the current image or video slice based on a signaled intra prediction mode and data from previously decoded blocks of the current frame or picture. When the image or frame is coded as an inter-coded (e.g., B, P or GPB) slice, motion compensation unit 472 produces predictive blocks for a video block of the current video slice based on the motion vectors and other syntax elements received from entropy decoding unit 470. The predictive blocks may be produced from one of the reference pictures within one of the reference picture lists. Decoder 230 (e.g., the motion compensation unit 472) may construct the reference frame lists, List 0, List 1, and/or List C, using default construction techniques based on reference pictures stored in reference frame memory 482. Motion compensation unit 472 determines prediction information for a video block of the current video slice by parsing the motion vectors and other syntax elements, and uses the prediction information to produce the predictive blocks for the current video block being decoded. For example, motion compensation unit 472 uses some of the received syntax elements to determine a prediction mode (e.g., intra- or inter-prediction) used to code the blocks of the video slice, an inter-prediction slice type (e.g., B slice, P slice, or GPB slice), construction information for one or more of the reference picture lists for the slice, motion vectors for each inter-encoded block of the image or slice, inter-prediction status for each inter-coded block of the image or slice, and/or other information to decode the blocks in the current image or video slice.

In addition, the motion compensation unit 472 generates a disparity map by comparing two images that are received in sequence (e.g., a left image and a right image) and determining disparity values for each portion (e.g., each pixel, each group of pixels, etc.) in the received images in a manner as described herein. For example, the disparity values can be determined by analyzing the motion between two images. The motion compensation unit 472 can upscale the disparity map to generate a depth map.

Motion compensation unit 472 may also perform interpolation based on interpolation filters. Motion compensation unit 472 may use interpolation filters as used by encoder 120 during encoding of the video blocks to calculate interpolated values for sub-integer pixels of reference blocks. In this case, motion compensation unit 472 may determine the interpolation filters used by encoder 120 from the received syntax elements and use the interpolation filters to produce predictive blocks.

Inverse quantization unit 476 inverse quantizes (e.g., de-quantizes) the quantized transform coefficients provided in the bitstream and decoded by entropy decoding unit 70. The inverse quantization process may include use of a quantization parameter $QP_Y$ calculated by encoder 120 for each video block in the video slice to determine a degree of quantization and, likewise, a degree of inverse quantization that should be applied.

Inverse transform unit 478 applies an inverse transform (e.g., an inverse DCT), an inverse integer transform, or a conceptually similar inverse transform process, to the transform coefficients in order to produce residual blocks in the pixel domain.

In some cases, inverse transform unit 478 may apply a 2-dimensional (2-D) inverse transform (in both the horizontal and vertical direction) to the coefficients. According to the techniques of this disclosure, inverse transform unit 478 may instead apply a horizontal 1-D inverse transform, a vertical 1-D inverse transform, or no transform to the residual data in each of the TUs. The type of transform applied to the residual data at encoder 120 may be signaled to decoder 230 to apply an appropriate type of inverse transform to the transform coefficients.

After motion compensation unit 472 generates the predictive block for the current block based on the motion vectors and other syntax elements, decoder 230 forms a decoded video block by summing the residual blocks from inverse transform unit 478 with the corresponding predictive blocks generated by motion compensation unit 472. Summer 480 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 482, which stores reference pictures used for subsequent motion compensation. Reference frame memory 482 also stores decoded video for later presentation on a display device, such as image device 123 of FIG. 1 or image display 232 of FIG. 2.

Computing the Depth Map

The techniques disclosed herein are described with respect to encoders, such as encoder 120. However, this is not meant to be limiting. The same techniques can be used by decoders, such as decoder 230, to accomplish similar results.

Encoders, such as encoder 120, convert raw video frames into standard compressed formats. The compression process is aided by a motion detection algorithm that computes pixelwise/blockwise motion for inter-coded frames. As discussed above, inter-coded frames can be of two types: P-frames and B-frames. P-frames contain forward motion values referring to a previous intra-coded frame (I-frame). B-frames contain bi-directional motion values, referring to previous and next intra-coded frames. An intra-coded frame is encoded spatially. An intra-coded frame is not associated with any motion values or any other frame in the stream. The motion value in an inter-coded frame is the disparity or difference between the two video frames. In an embodiment, if a normal 2D video stream (e.g., the images captured using a single camera) is replaced with a video stream that includes interleaved left (L) and right (R) views of a 3D video stream (e.g., the images captured using two cameras), the motion values represent the disparity between each pair of L and R frames (e.g., the difference in the spatial orientation between the L and R frames).

Figure 5:
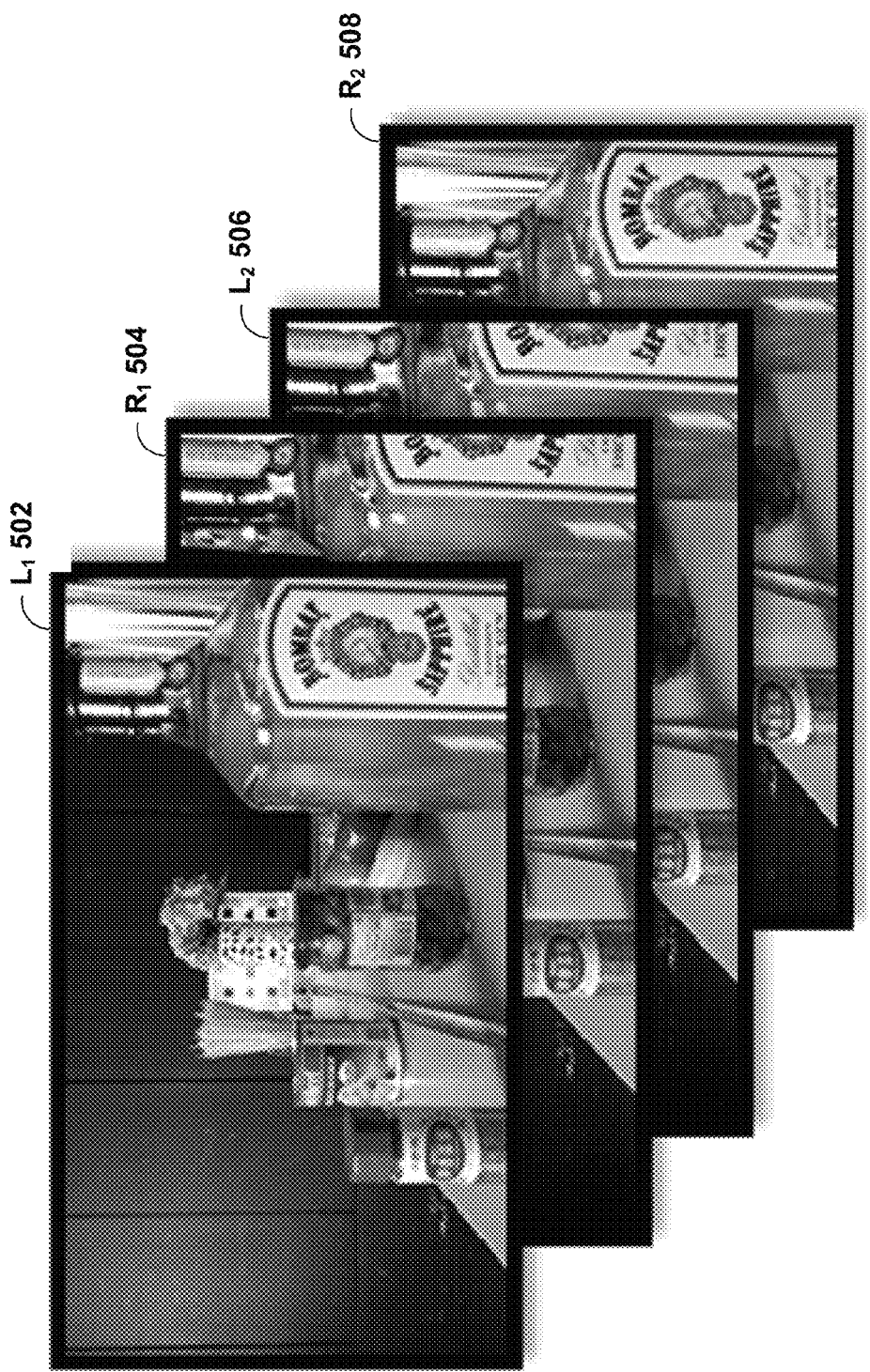
FIG. 5 illustrates a sequencing of frames.

The encoder may be configured to encode alternate frames of the interleaved stereo video as I-frames and P-frames. FIG. 5 illustrates a sequencing of frames. As illustrated in FIG. 5, the sequence includes four frames: $L_1$ 502, $R_1$ 504, $L_2$ 506, and $R_2$ 508. For the sake of simplicity, only four frames are illustrated; however, the techniques described herein apply to any number of frames. In an embodiment, $L_1$ 502 is the first frame received by encoder 120 and $R_2$ 508 is the last frame received by encoder 120. The L frames (e.g., $L_1$ 502 and $L_2$ 506) are encoded as I-frames and the R frames (e.g., $R_1$ 504 and $R_2$ 508) are encoded as P-frames. Thus, the sequence of frames as received by the encoder 120 alternates between I-frames and P-frames. This helps ensure that disparity values can be calculated.

Figure 6:
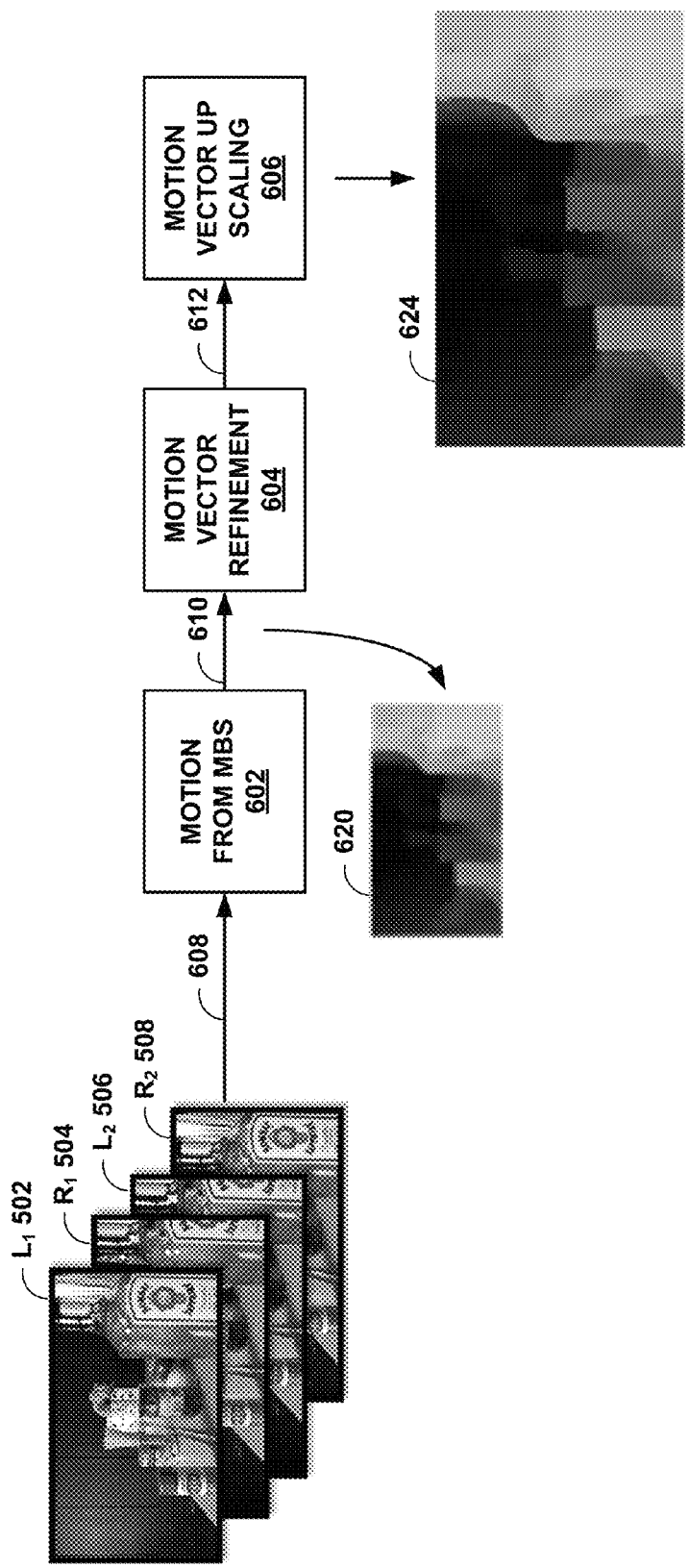
FIG. 6 illustrates a depth computation flow.

FIG. 6 illustrates a depth computation flow. As illustrated in FIG. 6, encoder 120 receives the sequence of frames $L_1$ 502, $R_1$ 504, $L_2$ 506, and $R_2$ 508 as data 608. In an embodiment, encoder 120 is set to a high-bitrate setting so that the P-frame has mostly inter-coded macroblocks (MBs). As an example, the minimum MB size may be 8×8. It may be desirable to have as many inter-coded macroblocks as possible in the R frame because the inter-coded macroblocks contain the motion vector information referring back to the corresponding L frame.

Encoder 120 can extract motion vector information from the MBs (represented by box 602) as data 610, and the blocks that are inter-coded and intra-coded can be graphically represented in downsampled depth map 620. Black blocks, not shown, in downsampled depth map 620 may represent the intra-coded blocks. Intra-coded blocks may be common in the occluded or the revealed regions where no match can be found between the L and R frames.

In an embodiment, the MB motion in the X direction can approximately represent the blockwise disparity between the two stereo frames (which can be converted into a depth map). The smaller the MB size, the higher the depth map resolution. The MB frame can be further cleared of intra-coded patches and noisy depth values by refinements, such as median filtering (e.g., a 5×5 median filter) (represented by box 604). In an example, because the minimum MB size is 8×8 pixels, the MB motion image is 8 times downsampled as compared to the original input frame. To apply enhancement algorithms, the image may have to be upsampled by a factor of 8 (or another similar value).

The upscaling is represented by box 606. In an embodiment, the encoder 120 upscales the depth map 620 by pixel-repeating the depth map 620. The encoder 120 may determine a depth filter for each pixel by using a size of a filter kernel, a spatial distance of the pixel being filtered from the center of the kernel (e.g., $s_d$), and/or a gradient of the disparity computed at the pixel being filtered and a gradient of the color components of the image computed at the pixel being filtered (e.g., $i_d$). The depth filter may be a product of two Gaussian components: a spatial component (e.g., $-e^{-(sd*sd)/\lambda_s}$) and an image color and depth value gradient component (e.g., $e^{-(id*id)/\lambda_c}$), where $\lambda_s$ and $\lambda_c$ may decide a spread factor of the corresponding Gaussian kernel. The encoder 120 may carry out a plurality of filtering iterations on a previously filtered depth map to improve the depth map. In another embodiment, the encoder 120 upscales the depth map 620 using sensor inputs. For example, the encoder 120 may create an initial estimate using a simple, bilinear upscale. The encoder 120 may identify depth transitions in the initial estimate, fill in depth values at the transitions using extrapolation, and smooth the filled depth values (e.g., reduce the difference in depth values at the depth transitions). The result of upscaling may be graphically represented by depth map 624, which includes fewer black blocks and is an upsampled version of downsampled depth map 620.

The upscaling represented by box 606 and performed by the encoder 120 may have several benefits. For instance, depth map computation from stereo images can be a computationally intensive process. Using the process described herein, the encoder 120 can then reduce computational resource usage and increase processing speed if the encoder 120 processes smaller images or generates sparse (e.g., downsampled) depth maps. In addition, if inaccurate, an upscaled depth map can affect depth map segmentation and final enhancement quality. Thus, using the process described herein, the encoder 120 can improve depth map segmentation and/or final enhancement quality as compared to encoders that use a generic upscaling process.

In an embodiment, a depth map generated by the encoder 120 has a higher enhancement quality than a depth map generated using a generic upscaling process. While a ground truth depth map (e.g., an ideal depth map) may have a higher enhancement quality than the depth map generated by the encoder 120, the encoder 120 may use fewer samples (e.g., 1/256 the number of samples) as would be used when generating the ground truth depth map.

Performing Image Enhancement Using the Depth Map

In an embodiment, the depth map, such as depth map 624, may be used to enhance a stereo image or video. For example, the depth map 624 can be used to demonstrate edge enhancement in a scene (e.g., the sharpening of an object in a scene). As another example, the depth map 624 can be used to adjust contrast in a scene, change colors in the scene, change geometric shapes in the scene, and/or the like. The edge enhancement can vary in strength based on depth of the object in the scene. In an embodiment, the idea is to select an object in a picture using a cursor. An algorithm separates out the object or the region from the rest of the image based on the depth map and applies different degrees of enhancement or different filters based on the depth.

Figure 7:
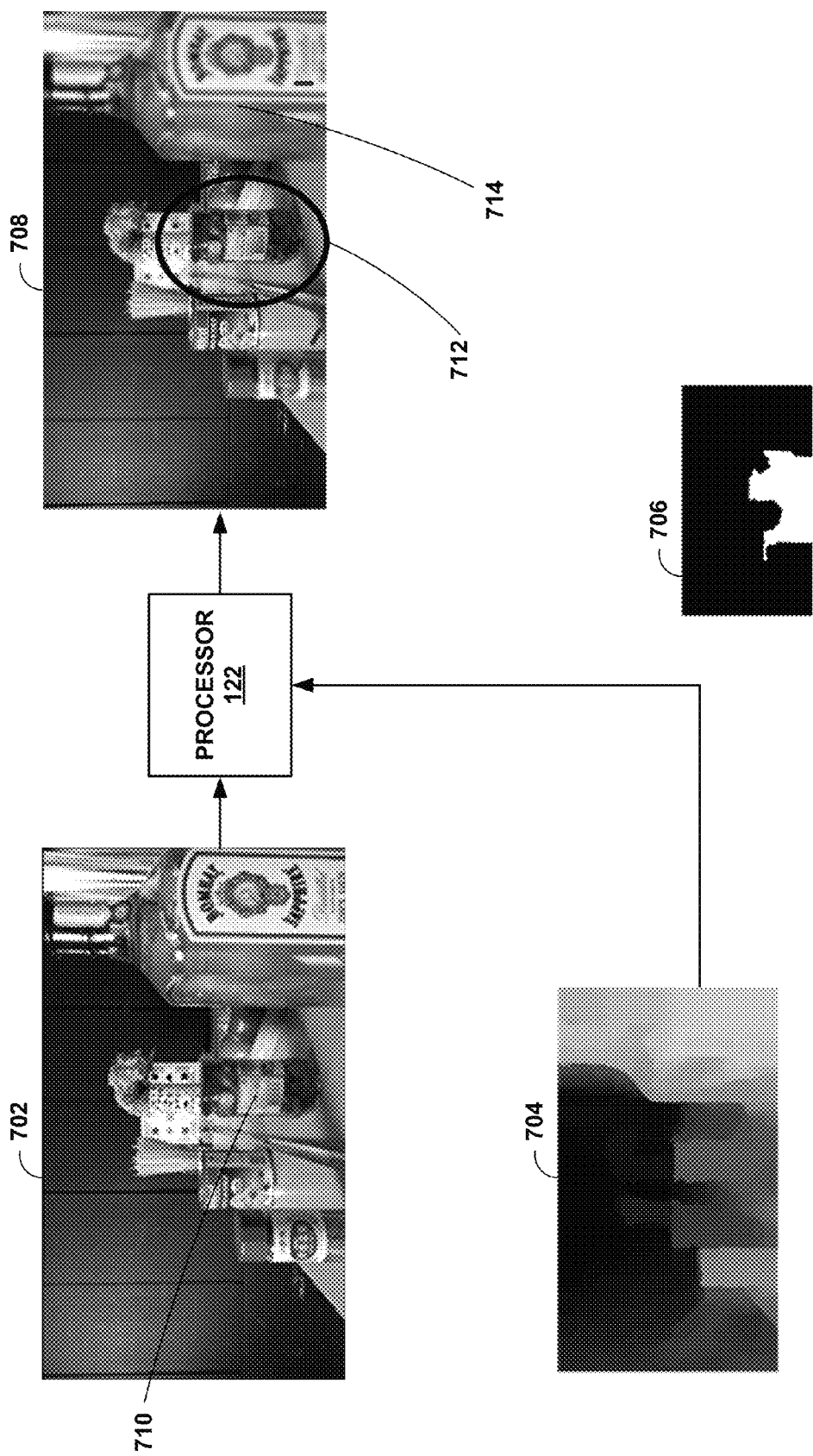
FIG. 7 illustrates a flow for enhancing an image.

FIG. 7 illustrates a flow for enhancing an image. As illustrated in FIG. 7, an image 702 is enhanced by processor 122 into enhanced image 708. A portion of image 702 is selected at point 710. The processor 122 can retrieve depth map 704 from encoder 120 in response to the selection or in response to generation of the depth map 704 at an earlier time. As an example, the depth value of the image 702 at point 710 is D. A threshold of $\pm\Delta$ around D can be set by processor 122. The threshold $\pm\Delta$ can alternatively be computed by processor 122 based on the maximum depth range as well.

Using a brushstroke (or similar shape) of size N×N, the processor 122 can grow a region R surrounding the point 710 by identifying a continuous portion of the image 702 starting from the point 710 that has a depth of D±Δ (e.g., D plus or minus the threshold). In an embodiment, the region R can be in any form or shape.

In some embodiments, the processor 122 stops growing the region R in a direction once a portion of the image 702 is reached that has a depth other than a depth of D±Δ. In other embodiments, the processor 122 stops growing the region R in a direction once the region R hits a preset boundary condition. In still other embodiments, the processor 122 stops growing the region R in a direction once a boundary of the region R reaches a certain distance from the point 710.

The processor 122 can then enhance the portion of the image 702 within the region R once the processor 122 stops growing region R. For example, the portion within the region R can be enhanced by using a high pass filter. The portion of the image outside of the region R can be smoothed (or blurred) by using a gaussian blur that is proportional to the difference between the depth D and the depth of the respective portion of the image 702. As another example, the portion within the region R can be enhanced by modifying the color of the pixels within the region R. As another example, the portion within the region R can be cut and/or moved to another portion of the image 702. As illustrated in FIG. 7, the white portion of depth map 706 represents the shape and size of region R when point 710 is selected. Likewise, region 712 in image 708 roughly represents the shape and size of region R when point 710 is selected. Region 714 roughly represents the area of image 708 outside of region R when point 710 is selected.

Figure 8:
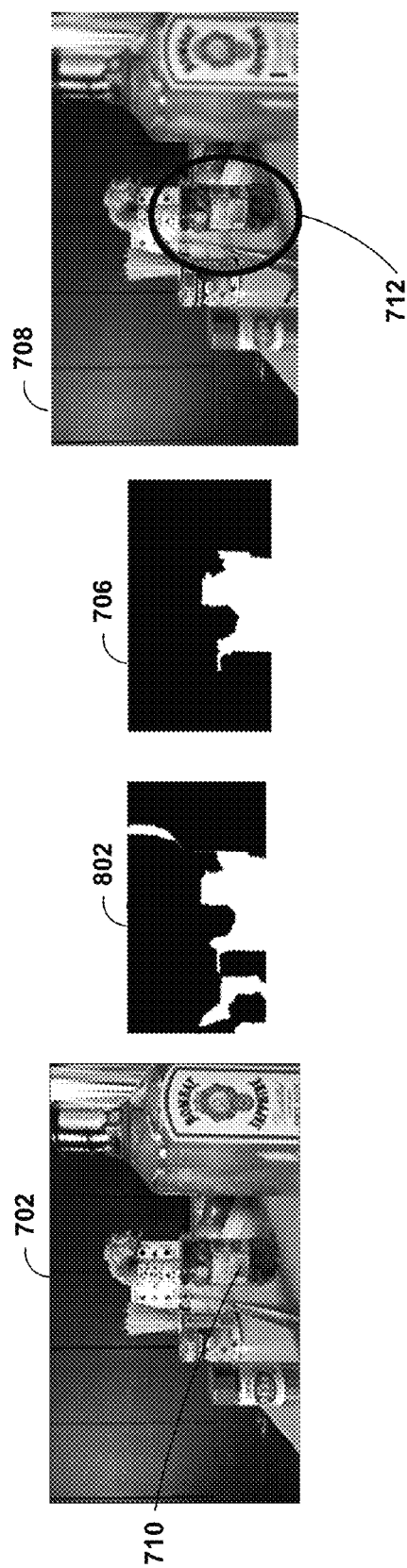
FIG. 8 illustrates another flow for enhancing an image.

FIG. 8 illustrates another flow for enhancing an image. As illustrated in FIG. 8, different non-contiguous portions of image 702 can have the same depth value (within a threshold value). For example, the white portions of depth map 802 all have the same depth value within a threshold value. However, because there are gaps between the white portions in depth map 802, not all of the white portions will be enhanced by processor 122. As discussed above with respect to FIG. 7, point 710 is selected in image 702. Thus, while several portions of image 702 include the same depth value within a threshold value, only the portions of image 702 that include pixels that are contiguous with point 710 and that have a depth value within a threshold value of the depth at point 710 are enhanced (e.g., the portions of image 702 surrounding point 710 are enhanced up to the point that an edge is reached in the depth map 802). Depth map 706 illustrates those portions of image 702 that satisfy such criteria. Accordingly, region 712 of image 708 is enhanced, and the other portions of image 708 are either left alone or degraded.

Example Use Case

Figure 9:
FIG. 9 illustrates an example original image.
Figure 10A:
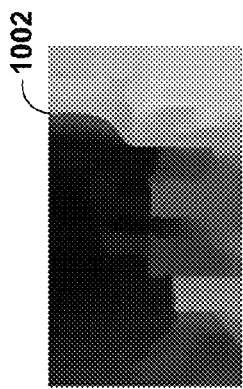
FIG. 10A illustrates a depth map that can be computed by the encoder based on the original image in FIG. 9.
Figure 10B:
FIG. 10B illustrates the depth map of FIG. 9 after it is refined and upscaled.

FIG. 9 illustrates an example original image 902. FIG. 10A illustrates a depth map 1002 that can be computed by the encoder 120 based on the original image 902 in FIG. 9. FIG. 10B illustrates the depth map 1002 after it is refined and upscaled (e.g., to a 0-255 scale).

Figure 11:
FIGS. 11-13 illustrate various images that are enhanced using the scaled depth map of FIG. 10B.
Figure 12:
Figure 13:
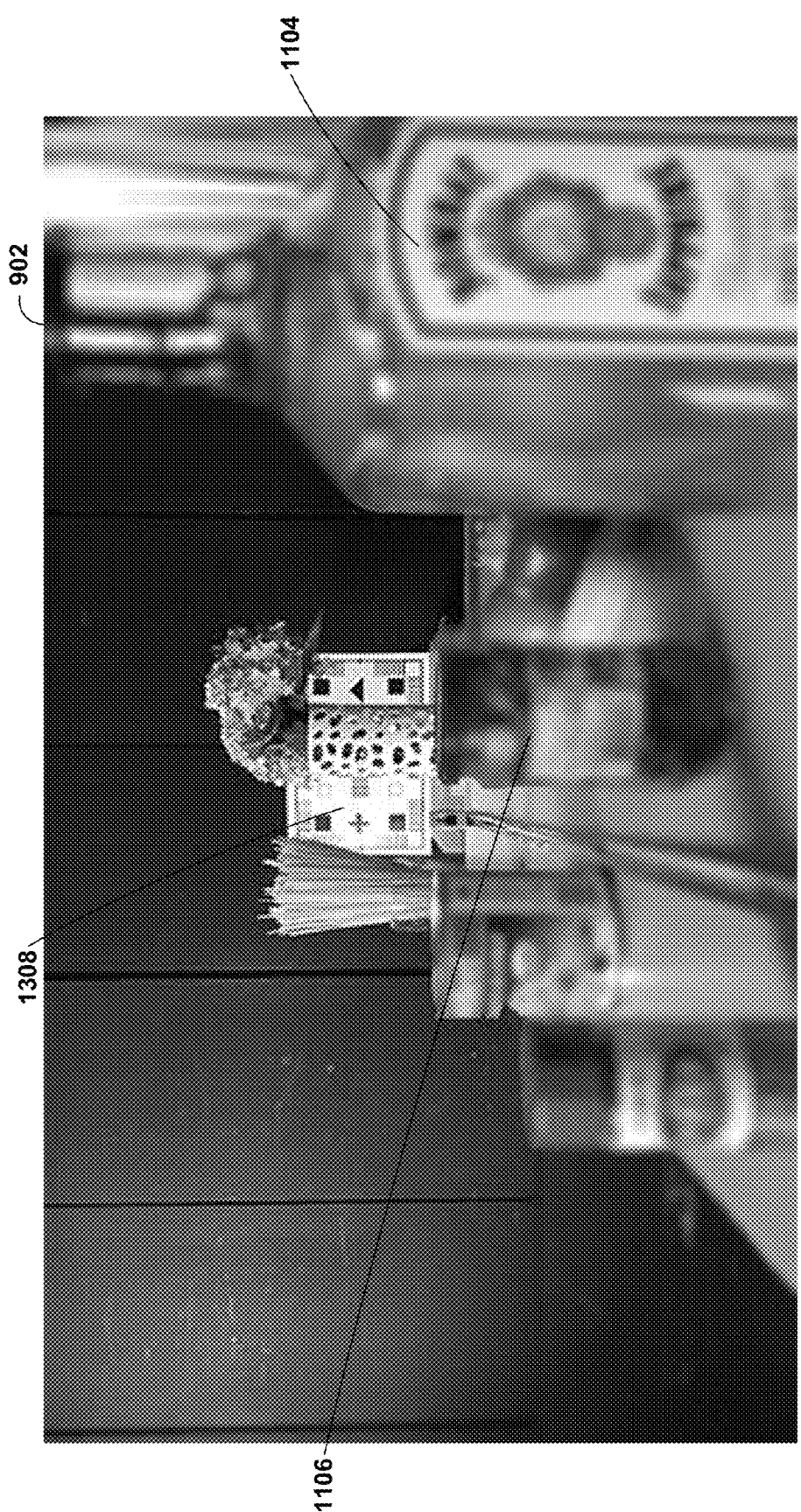

FIGS. 11-13 illustrate various images that are enhanced using the scaled depth map 1002 as described herein. As illustrated in FIG. 11, point 1104 is selected, and pixels that are contiguous with point 1104 and that share a depth value within a threshold value are enhanced. Point 1106 and other portions of image 902 are degraded.

As illustrated in FIG. 12, point 1106 is selected, and pixels that are contiguous with point 1106 and that share a depth value within a threshold value are enhanced. Point 1104 and other portions of image 902 are degraded.

As illustrated in FIG. 13, point 1308 is selected, and pixels that are contiguous with point 1308 and that share a depth value within a threshold value are enhanced. Points 1104 and 1106 and other portions of image 902 are degraded.

Figure 14:
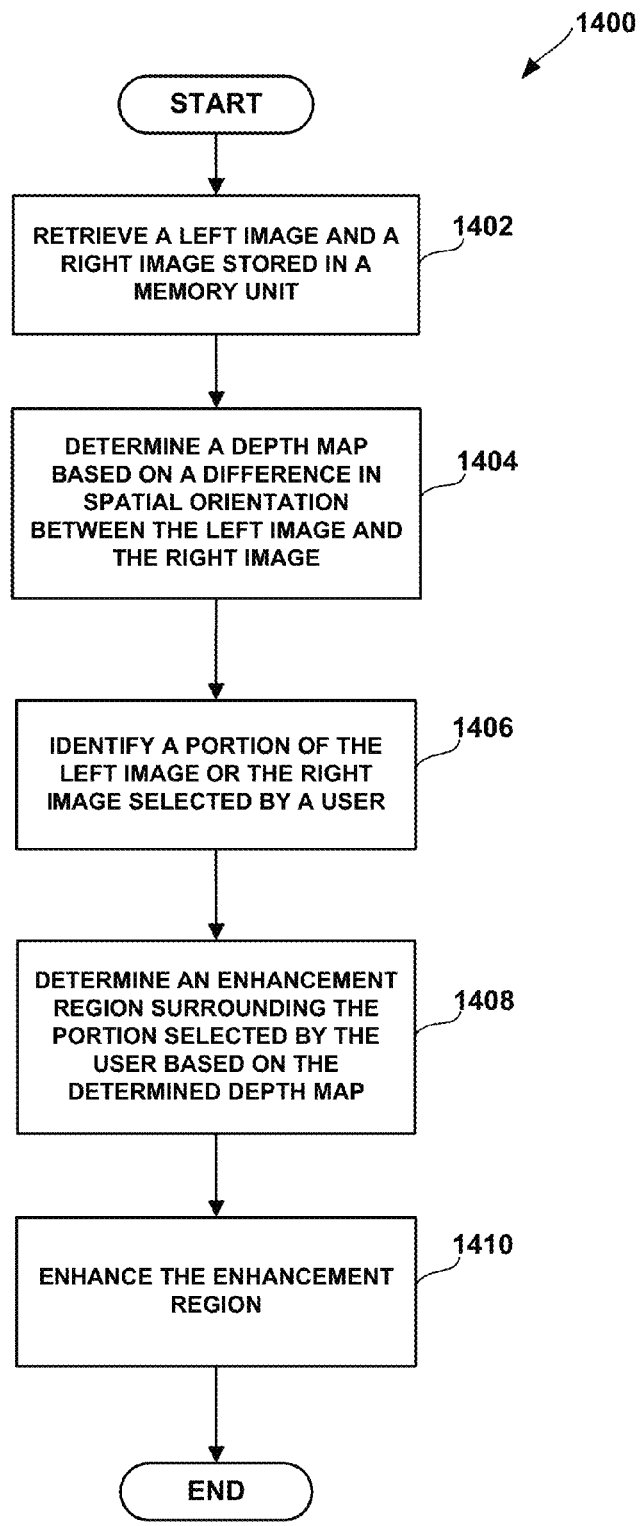
FIG. 14 illustrates an example method for enhancing an image.

FIG. 14 illustrates an example method 1400 for enhancing an image. The method 1400 can be performed by one or more components of a portable electronic device. For example, the method 1400 can be performed by encoder 120 (e.g., motion estimation unit 342), decoder 230 (e.g., motion compensation unit 472), and/or processor 122, for example. In some embodiments, other components may be used to implement one or more of the steps described herein.

At block 1402, a left image and a right image stored in a memory unit are retrieved. In an embodiment, the left image and the right image each depict a same scene. At block 1404, a depth map based on a difference in spatial orientation between the left image and the right image is determined.

At block 1406, a portion of the left image or the right image selected by a user is identified. At block 1408, an enhancement region surrounding the portion selected by the user is determined based on the determined depth map. At block 1410, the enhancement region is enhanced.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware. Various examples have been described. These and other examples are within the scope of the following claims.

What is claimed is:

1. A method for enhancing an image, the method comprising:
   retrieving a left image and a right image stored in a memory unit, the left image and the right image each depicting a same scene from a different viewpoint;
   determining a depth map based on a difference in spatial orientation between the left image and the right image;
   identifying a portion of the left image or the right image selected by a user, wherein the selected portion comprises a first depth;
   determining an enhancement region surrounding the selected portion based on the determined depth map, wherein the enhancement region comprises a continuous portion of the left image or the right image starting from the selected portion of the left image or the right image that has a depth within a threshold of the first depth; and
   enhancing the enhancement region.

2. The method of claim 1, further comprising degrading a portion of the left image or the right image not selected by the user.

3. The method of claim 2, wherein degrading a portion of the left image or the right image not selected by the user comprises blurring the portion of the left image or the right image not selected by the user.

4. The method of claim 1, wherein determining a depth map further comprises:
determining a disparity map based on the difference in spatial orientation between the left image and the right image, wherein a larger difference in spatial orientation between a portion of the left image and the right image indicates a higher disparity;
upscaling the disparity map; and
determining the depth map based on the upscaled disparity map.

5. The method of claim 4, wherein determining a disparity map comprises determining a distance between a block in the left image and a corresponding block in the right image, wherein a first block corresponds with a second block if the first block and the second block are identical within a threshold value.

6. The method of claim 1, wherein determining an enhancement region surrounding the selected portion further comprises:
identifying the continuous portion of the left image or the right image starting from the selected portion of the left image or the right image that has the depth within the threshold of the first depth; and
increasing a size of the enhancement region surrounding the selected portion until a portion of the left image or the right image is identified that does not have a depth within a threshold of the first depth, that represents a preset boundary, or that is a threshold distance from the selected portion.

7. The method of claim 1, wherein enhancing comprises at least one of sharpening the enhancement region, moving the enhancement region to a different portion of the left image or the right image, or adjusting a color of the enhancement region.

8. The method of claim 1, the method being executable on a wireless communication device, wherein the device comprises:
the memory unit configured to store the left image and the right image;
a processor configured to execute instructions to process the left image and the right image stored in the memory unit; and
a transmitter configured to transmit the depth map to a destination device.

9. The method of claim 8, wherein the wireless communication device is a cellular telephone and the depth map is transmitted by the transmitter and modulated according to a cellular communication standard.

10. An apparatus for enhancing an image, the apparatus comprising:
means for retrieving a left image and a right image stored in a memory unit, the left image and the right image each depicting a same scene from a different viewpoint;
means for determining a depth map based on a difference in spatial orientation between the left image and the right image;
means for identifying a portion of the left image or the right image selected by a user, wherein the selected portion comprises a first depth;
means for determining an enhancement region surrounding the selected portion based on the determined depth map, wherein the enhancement region comprises a continuous portion of the left image or the right image starting from the selected portion of the left image or the right image that has a depth within a threshold of the first depth; and
means for enhancing the enhancement region.

11. The apparatus of claim 10, further comprising means for degrading a portion of the left image or the right image not selected by the user.

12. The apparatus of claim 11, wherein means for degrading a portion of the left image or the right image not selected by the user comprises means for blurring the portion of the left image or the right image not selected by the user.

13. The apparatus of claim 10, wherein means for determining a depth map further comprises:
means for determining a disparity map based on the difference in spatial orientation between the left image and the right image, wherein a larger difference in spatial orientation between a portion of the left image and the right image indicates a higher disparity;
means for upscaling the disparity map; and
means for determining the depth map based on the upscaled disparity map.

14. The apparatus of claim 13, wherein means for determining a disparity map comprises means for determining a distance between a block in the left image and a corresponding block in the right image, wherein a first block corresponds with a second block if the first block and the second block are identical within a threshold value.

15. The apparatus of claim 10, wherein means for determining an enhancement region surrounding the selected portion further comprises:
means for identifying the continuous portion of the left image or the right image starting from the selected portion of the left image or the right image that has the depth within the threshold of the first depth;
means for increasing a size of the enhancement region surrounding the selected portion until a portion of the left image or the right image is identified that does not have a depth within a threshold of the first depth, that represents a preset boundary, or that is a threshold distance from the selected portion.

16. The apparatus of claim 10, wherein means for enhancing comprises at least one of means for sharpening the enhancement region, means for moving the enhancement region to a different portion of the left image or the right image, or means for adjusting a color of the enhancement region.

17. The apparatus of claim 10, wherein the means for retrieving and the means for determining a depth map comprise an encoder, and wherein the means for identifying, the means for determining an enhancement region, and the means for enhancing comprise a processor.

18. A non-transitory computer-readable medium comprising code that, when executed, causes an apparatus to:
retrieve a left image and a right image stored in a memory unit, the left image and the right image each depicting a same scene from a different viewpoint;
determine a depth map based on a difference in spatial orientation between the left image and the right image;
identify a portion of the left image or the right image selected by a user, wherein the selected portion comprises a first depth;
determine an enhancement region surrounding the selected portion based on the determined depth map, wherein the enhancement region comprises a continuous portion of the left image or the right image starting from the selected portion of the left image or the right image that has a depth within a threshold of the first depth; and enhance the enhancement region.

19. The medium of claim 18, further comprising code that, when executed, causes an apparatus to:

determine a disparity map based on the difference in spatial orientation between the left image and the right image, wherein a larger difference in spatial orientation between a portion of the left image and the right image indicates a higher disparity;

upscale the disparity map; and determine the depth map based on the upscaled disparity map.

20. The medium of claim 19, further comprising code that, when executed, causes an apparatus to determine a distance between a block in the left image and a corresponding block in the right image, wherein a first block corresponds with a second block if the first block and the second block are identical within a threshold value.

21. The medium of claim 18, further comprising code that, when executed, causes an apparatus to:

identify the continuous portion of the left image or the right image starting from the selected portion of the left image or the right image that has the depth within the threshold of the first depth; and increase a size of the enhancement region surrounding the selected portion until a portion of the left image or the right image is identified that does not have a depth within a threshold of the first depth, that represents a preset boundary, or that is a threshold distance from the selected portion.

22. A device for enhancing an image, the device comprising:

a memory unit configured to store a left image and a right image, the left image and the right image each depicting a same scene from a different viewpoint;

a coder configured to retrieve the left image and the right image from the memory unit, wherein the coder is further configured to determine a depth map based on a difference in spatial orientation between the left image and the right image; and a processor coupled to the coder, the processor configured to identify a portion of the left image or the right image selected by a user, wherein the selected portion by the user comprises a first depth, wherein the processor is further configured to determine an enhancement region surrounding the portion selected by the user based on the determined depth map, wherein the enhancement region comprises a continuous portion of the left image or the right image starting from the selected portion of the left image or the right image that has a depth within a threshold of the first depth, and wherein the processor is further configured to enhance the enhancement region.

23. The device of claim 22, wherein the processor is further configured to degrade a portion of the left image or the right image not selected by the user.

24. The device of claim 23, wherein the processor is further configured to blur the portion of the left image or the right image not selected by the user.

25. The device of claim 22, wherein the coder is further configured to:

determine a disparity map based on the difference in spatial orientation between the left image and the right image, wherein a larger difference in spatial orientation between a portion of the left image and the right image indicates a higher disparity;

upscale the disparity map; and determine the depth map based on the upscaled disparity map.

26. The device of claim 25, wherein the coder is further configured to determine a distance between a block in the left image and a corresponding block in the right image, and wherein a first block corresponds with a second block if the first block and the second block are identical within a threshold value.

27. The device of claim 22, wherein the processor is further configured to:

identify the continuous portion of the left image or the right image starting from the portion of the left image or the right image that has the depth within the threshold of the first depth; and increase a size of the enhancement region surrounding the selected portion until a portion of the left image or the right image is identified that does not have a depth within a threshold of the first depth, that represents a preset boundary, or that is a threshold distance from the selected portion.

28. The device of claim 22, wherein the processor is further configured to at least one of sharpen the enhancement region, move the enhancement region to a different portion of the left image or the right image, or adjust a color of the enhancement region.

29. The device of claim 22, wherein the device is a wireless communication device, further comprising a transmitter configured to transmit the depth map to a destination device.

30. The device of claim 29, wherein the wireless communication device is a cellular telephone and the depth map is transmitted by the transmitter and modulated according to a cellular communication standard.

* * * * *